United States Patent
Cohn et al.

(10) Patent No.: US 9,820,115 B2
(45) Date of Patent: Nov. 14, 2017

(54) NOTIFICATION GENERATION VIA A DOCKING INTERFACE

(71) Applicant: Intel IP Corporation, Santa Clara, CA (US)

(72) Inventors: Daniel Cohn, Raanana (IL); Michael Glik, Kfar Saba (IL); Solomon Trainin, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/088,689

(22) Filed: Apr. 1, 2016

(65) Prior Publication Data

US 2017/0289778 A1    Oct. 5, 2017

(51) Int. Cl.
| | |
|---|---|
| *H04M 1/725* | (2006.01) |
| *H04W 4/12* | (2009.01) |
| *H04W 76/02* | (2009.01) |
| *H04W 48/16* | (2009.01) |

(52) U.S. Cl.
CPC ............. *H04W 4/12* (2013.01); *H04W 48/16* (2013.01); *H04W 76/023* (2013.01)

(58) Field of Classification Search
CPC . G06F 3/165; H04N 21/8113; H04M 1/72519
USPC .... 455/414.1, 66.1, 557, 41.2, 404.1, 556.1, 455/412.2; 715/716; 705/2; 710/303; 386/200
See application file for complete search history.

(56) References Cited

U.S. PATENT DOCUMENTS

| | | | |
|---|---|---|---|
| 2013/0297844 A1* | 11/2013 | Rosenberg | G06F 1/1632 710/303 |
| 2014/0059263 A1* | 2/2014 | Rosenberg | G06F 1/1632 710/303 |
| 2015/0056920 A1* | 2/2015 | Huttunen | H04B 7/26 455/41.2 |
| 2015/0282073 A1 | 10/2015 | Davidson et al. | |

FOREIGN PATENT DOCUMENTS

| | | |
|---|---|---|
| WO | WO-2014/139868 A1 | 9/2014 |
| WO | WO-2014/189660 A1 | 11/2014 |

OTHER PUBLICATIONS

European Search Report dated Jul. 12, 2017 for European Application No. 17158549.0.

* cited by examiner

Primary Examiner — Kiet Doan
(74) Attorney, Agent, or Firm — Schiff Hardin LLP

(57) ABSTRACT

Notification methods and devices are described. In notification method, a notification template corresponding to a notification is generated. The notification template can be provided to a docking system connected to a communication device. A notification control signal that corresponds to the notification template can be generated. The docking system is controlled to present the notification in response to the notification control signal. The docking system presenting the notification can use one or resources of the docking system based on the notification template.

13 Claims, 4 Drawing Sheets

NOTIFICATION GENERATION VIA A DOCKING INTERFACE

BACKGROUND

Field

Aspects described herein generally relate to notification management of communication devices using a docking system, including notifications during a low-powered operating mode.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, communication devices can be configured to communicate and connect with a corresponding docking system. A docking system can include one or more peripheral devices connected thereto that can be accessed and used by a connected communication device. Peripheral devices can include (but not limited to), for example, monitors or other displays; visual projection systems; input devices such as a keyboard, a mouse, and/or touchpad; cameras; storage devices (e.g., memory, hard drives, etc.); and/or input/output ports, such as network communication interfaces (e.g., Ethernet port), universal serial bus (USB) ports, etc.

In operation, communication devices, such as mobile devices, can pass notifications to a connected docking system and the notifications (e.g., audio, visual, vibration, etc.) can be presented by the docking system. Notifications can be classified by application, type, importance, etc., and the operation of passing the notifications to the docking system can be based on one or more classifications.

Examples of mobile devices include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 140 may be a stationary communication device.

Figure 1:
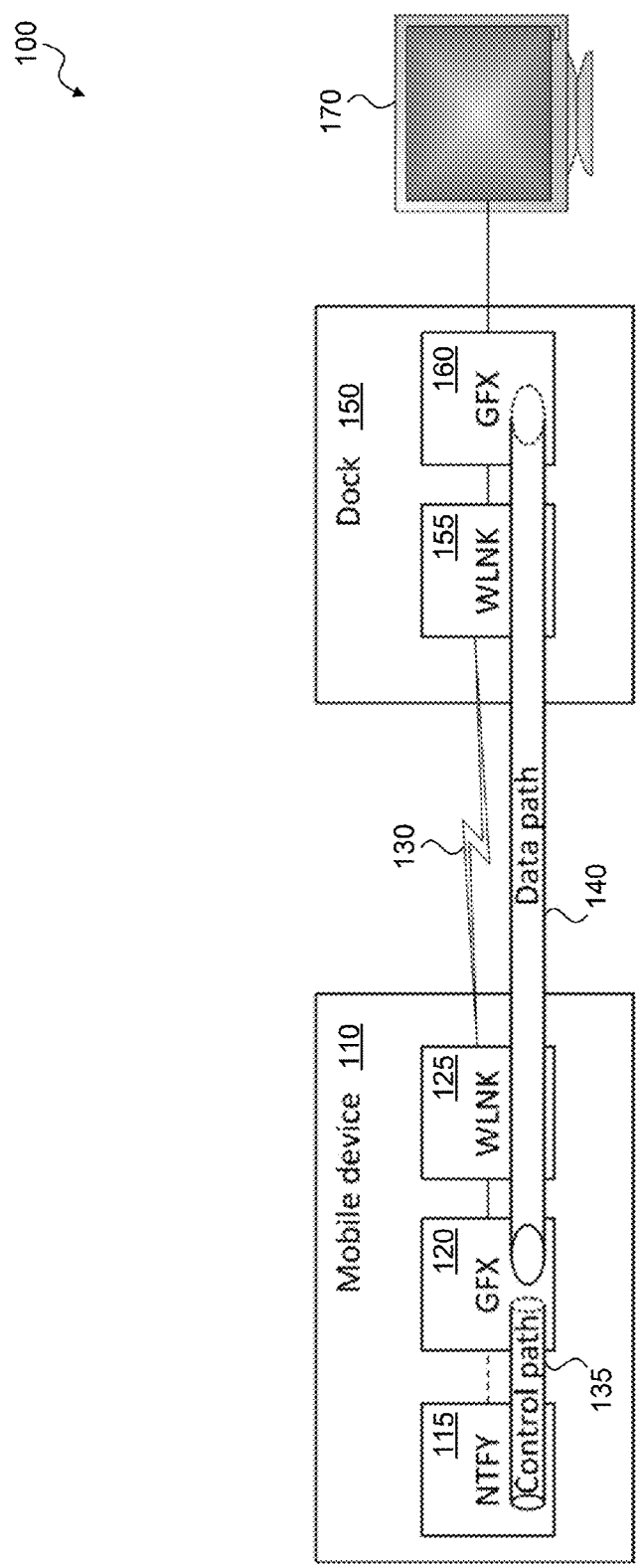
FIG. 1 illustrates a mobile device and docking system according to an exemplary aspect of the present disclosure.

FIG. 1 illustrates a communication system 100 according to an exemplary aspect of the present disclosure. The communication system 100 includes a communication device, such as mobile device 110, and docking system 150 (also referred to as dock 150). The mobile device 110 is configured to wirelessly communicate with the dock 150 via communication channel 130. In this example, the communication channel 130 is a wireless communication channel established using one or more wireless technologies.

The wireless technologies can include (but are not limited to), for example, one or more cellular communication protocols (e.g., Long-Term Evolution (LTE)), Bluetooth, and/or one or more of the Institute of Electrical and Electronics Engineers' (IEEE) 802.11 protocols, such as (but not limited to) Wi-Fi (e.g., 802.11g, 802.11n, 802.11ac), Wireless Gigabit (WiGig) as defined by IEEE 802.11ad, and/or one or more other 802.11 protocols.

In an exemplary aspect, the mobile device 110 can include a notification controller (NTFY) 115, a multimedia system (GFX) 120, and a network interface (WLNK) 125.

The mobile device 110 can also include one or more transceivers configured for transmitting and/or receiving wireless communications conforming to one or more wireless protocols and/or technologies (e.g., LTE, WiFi, etc.). In an exemplary aspect, the transceiver is embodied in the network interface (WLNK) 125. In an exemplary aspect, the transceivers can be configured for transmitting and/or receiving wired communications.

The mobile device 110 can also include processor circuitry that is configured to control the overall operation of the mobile device 110, such as the operation of the notification controller (NTFY) 115, a multimedia system (GFX) 120, and a network interface (WLNK) 125. For example, the processor circuitry of the mobile device 110 can be configured to control the transmitting and/or receiving of wireless communications via the transceiver; the generation of the notifications by the notification controller 115, the generation of multimedia content by the multimedia system 120, establishment of the communication channel 130 by the network interface 125, and/or perform one or more baseband processing functions (e.g., media access control (MAC), encoding/decoding, modulation/demodulation, data symbol mapping; error correction, etc.). The processor circuitry can be configured to run one or more applications and/or operating systems; power management (e.g., battery control and monitoring); display settings; volume control; and/or user interactions via one or more user interfaces (e.g., keyboard, touchscreen display, microphone, speaker, etc.).

The mobile device 110 can further include one or more memory devices that stores data and/or instructions, where when the instructions are executed by the processor circuitry, controls the processor circuitry to perform the functions described herein. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory devices may be non-removable or removable.

In an exemplary aspect, the notification controller 115 can include processor circuitry configured to generate one or more notifications (e.g., audio, visual, vibration, etc.) and control the mobile device 110 to output the notifications using, for example, one or more speakers, light emitting diodes (LEDs), a display, a haptic (vibration) generator, etc. of the mobile device 110. The generation of the notification (s) can be based on, for example, one or more events and/or wireless communications with the mobile device 110. For example, the notification controller 115 can generate a notification in response to a communication received by the mobile device 110, such as in response to receiving a phone call, an email message, a short message service (SMS) message; in response to an event, such as an alarm or calendar event; in response to a request from one or more applications or operating systems installed on the mobile device 110; and/or in response to one or more other events or communications as would be understood by one of ordinary skill in the relevant arts.

In operation, the notification controller 115 can output audio notifications from, for example, a speaker of the mobile device 110; visual notifications using, for example, a notification LED, the display of the mobile device 115, the flash LED for the camera of the mobile device 110; vibrate the phone using one or more vibration mechanisms; and/or output the notification using other mechanisms as would be understood by those skilled in the art.

The mobile device 110 can be configured to operate in a reduced power mode where the power consumption of the mobile device 110 is reduced. While in a reduced power mode, the mobile device 110 can selectively generate and/or output notifications based on one or more characteristics of the notification. For example, notifications can be hierarchically classified, and the mobile device 110 can omit the generation and/or output of low-level notifications and allow only high-level (e.g., important) notifications to be generated and/or output.

The multimedia system (GFX) 120 includes processor circuitry configured to generate image, video, and/or audio data signals, including rendering images/videos, coding and/ or decoding image, video and/or audio data, compressing and/or decompressing image, video and/or audio data, and/ or one or more other processes to generate image, video, and/or audio data signals as would be understood by one of ordinary skill in the art. In an exemplary aspect, the multimedia system 120 can generate one or more image, video, and/or audio signals based on one or more notifications generated by the notification controller 115.

The network interface (WLNK) 125 can be configured to establish a communication channel between one or more other devices, such as the dock 150. The network interface 125 can be configured to transmit and/or receive wireless (and/or wired) communications conforming to one or more communication protocols and/or technologies to establish the communication channel 130. In an exemplary aspect, the network interface 125 is configured to establish a communication channel between the mobile device 110 and the dock 150 (using the network interface 155 of the dock 150). In this example, the network interface 155 of the dock 150 can be similar to (or the same as) the network interface of the mobile device 110.

With continued reference to FIG. 1, in an exemplary aspect, the mobile device 110 can be configured to generate and provide a notification to the dock 150, which is then configured to output the notification using one or more resources of the dock 150 and/or peripheral devices 170 connected the dock 150. Peripheral devices 170 can include (but limited to), for example, monitors or other displays; visual projection systems; input devices such as a keyboard, a mouse, and/or touchpad; cameras; storage devices (e.g., memory, hard drives, etc.); and/or input/output ports, such as network communication interfaces (e.g., Ethernet port), universal serial bus (USB) ports, etc.

For example, if the notification controller 115 of the mobile device 110 generates a notification in response to an email being received by the mobile device 110, the notification controller 115 can control the multimedia system 120 to generate image/video data corresponding to a visual email notification. The notification controller 115 can provide the notification to the multimedia system 120 via a control path 135 between the notification control 115 and the multimedia system 120.

The image/video data can then be provided to the dock 150 via a data path 140 established by the communication channel 130. A multimedia system 160 of the dock 150 can then drive, for example, a display of the peripheral devices 170 connected to the dock 150 based on the received image/video data. In this example, while the notification is being displayed on the display of the peripheral devices 170, the multimedia system 120 of the mobile device 120 continues to generate image/video data corresponding to the visual notification for the email.

Figure 2:
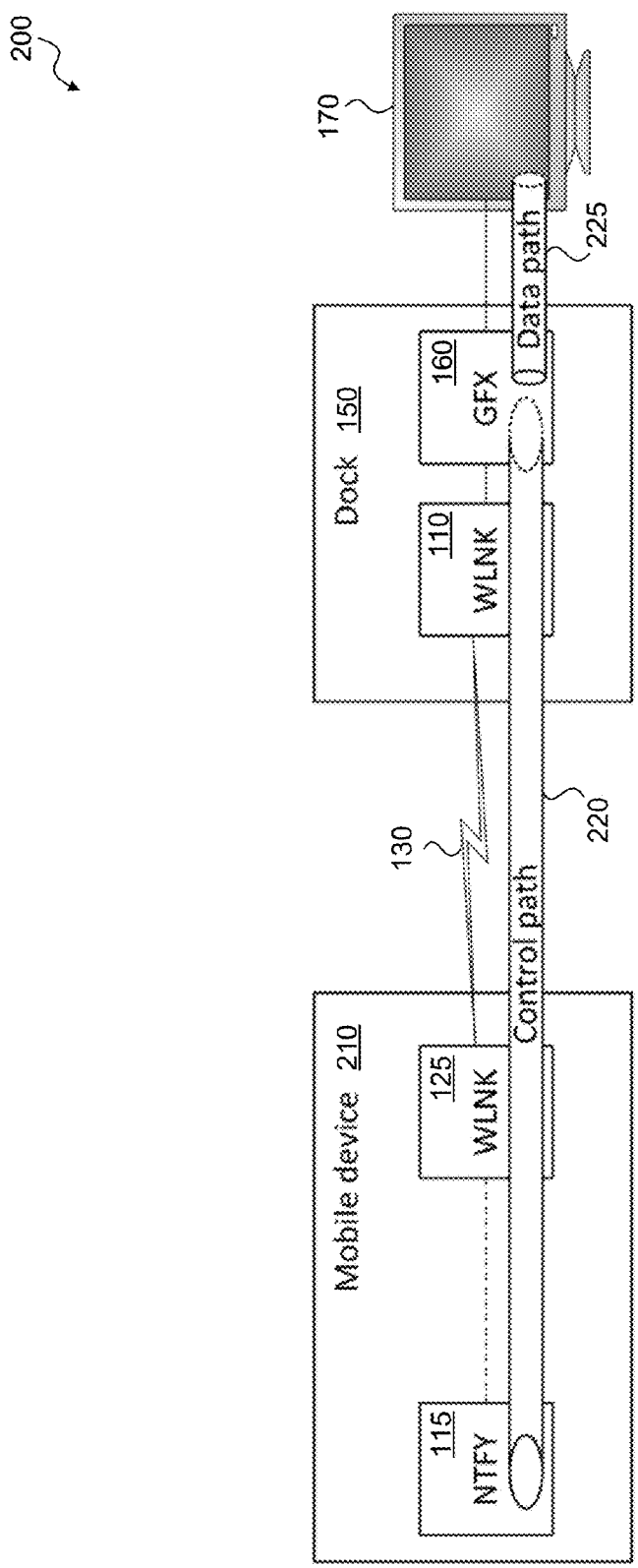
FIG. 2 illustrates a mobile device and docking system according to an exemplary aspect of the present disclosure.

FIG. 2 illustrates a communication system 200 according to an exemplary aspect of the present disclosure. The communication system 200 includes mobile device 210 and docking system 150. In an exemplary aspect, the mobile device 210 is similar to mobile device 110 and discussion of similar components and/or operations may have been omitted for brevity.

In an exemplary aspect, the mobile device 210 includes the notification controller 115 and the network interface 125. Although not shown, the mobile device 220 can include the multimedia system 120. In an exemplary aspect, the mobile device 210 can be configured to generate and provide a notification to the dock 150, which is then configured to output the notification using one or more resources of the dock 150 and/or peripheral devices connected the dock 150.

In an exemplary aspect, the mobile device 210 is configured to generate one or more notification templates corresponding to one or more notifications. A notification template includes image, video, and/or audio data corresponding to a notification. For example, for a visual notification to be displayed on a display of the dock 150, the notification template for this notification can include an image file of the image to be displayed for the notification. Similarly, for an audible notification to be played, for example, via a speaker of the dock 150, the notification template can include an audio file of the audio to be played via the speakers. In an exemplary aspect, the notification template can also include control information that defines one or more parameters for a notification image/video/audio for a corresponding notification. The parameters can define one or more attributes of a corresponding notification, including (but not limited to), for example: a volume level of an audio file for the notification; brightness of the display that displays a notification; brightness, duration, and/or a pulse frequency of a notification LED; intensity, duration, and/or pulse frequency of a haptic vibration, a sequence of audio files, images, and/or videos to be played/displayed if the application template defines multiple audio files/images/videos for a corresponding notification; and/or another attribute or other parameter as would be understood by one of ordinary skill in the relevant arts. For example, for an audio notification, the control information may set forth the volume at which the audio file for the corresponding notification is to be played. In an exemplary aspect, the notification controller 115 is configured to generate the notification templates.

In an exemplary aspect, upon connection to the dock 150, the mobile device 210 can provide one or more notification templates to the dock 150 via the communication path 130, and the dock 150 can store the notification templates. The mobile device 210 can also be configured to send notification templates if the notifications of corresponding notification templates are modified.

In an exemplary aspect, the mobile device 210 can control the dock 150 to present one or more notifications based on the notification templates. In this example, the notification controller 115 can control the dock 150 (i.e., the multimedia system 160) to generate a notification (e.g., drive a display of the peripheral devices 170) based on image, video, and/or audio data defined by a corresponding notification template. In an exemplary aspect, the notification controller 115 can provide a notification control signal to the multimedia system 160 via a control path 220 established by the communication channel 130. For example, the mobile device 210 generates and provides the notification control signal to the dock 150, which controls the dock 150 to generate and present a notification based on a notification template designated by the notification control signal. In this example, it is not necessary for the mobile device 210 to continuously generate audio/image/video data for the corresponding notification and provide the generated data to the dock 150. Rather, the mobile device 210 generates the notification control signal which instructs the dock 150 to generate the notification based on a corresponding notification template. In this example, the dock 150 is tasked with processing the audio/image/video data defined in the application template to generate the notification, which reduces the power intensive processing that is required by the mobile device 210, thereby reducing the power consumption of the mobile device 210. That is, in addition to offloading the output location of the notification from the mobile device 210 to the dock 150, the processing required for the generation and presentation of the notification is also offloaded from the mobile device 210 to the dock 150.

Figure 3A:
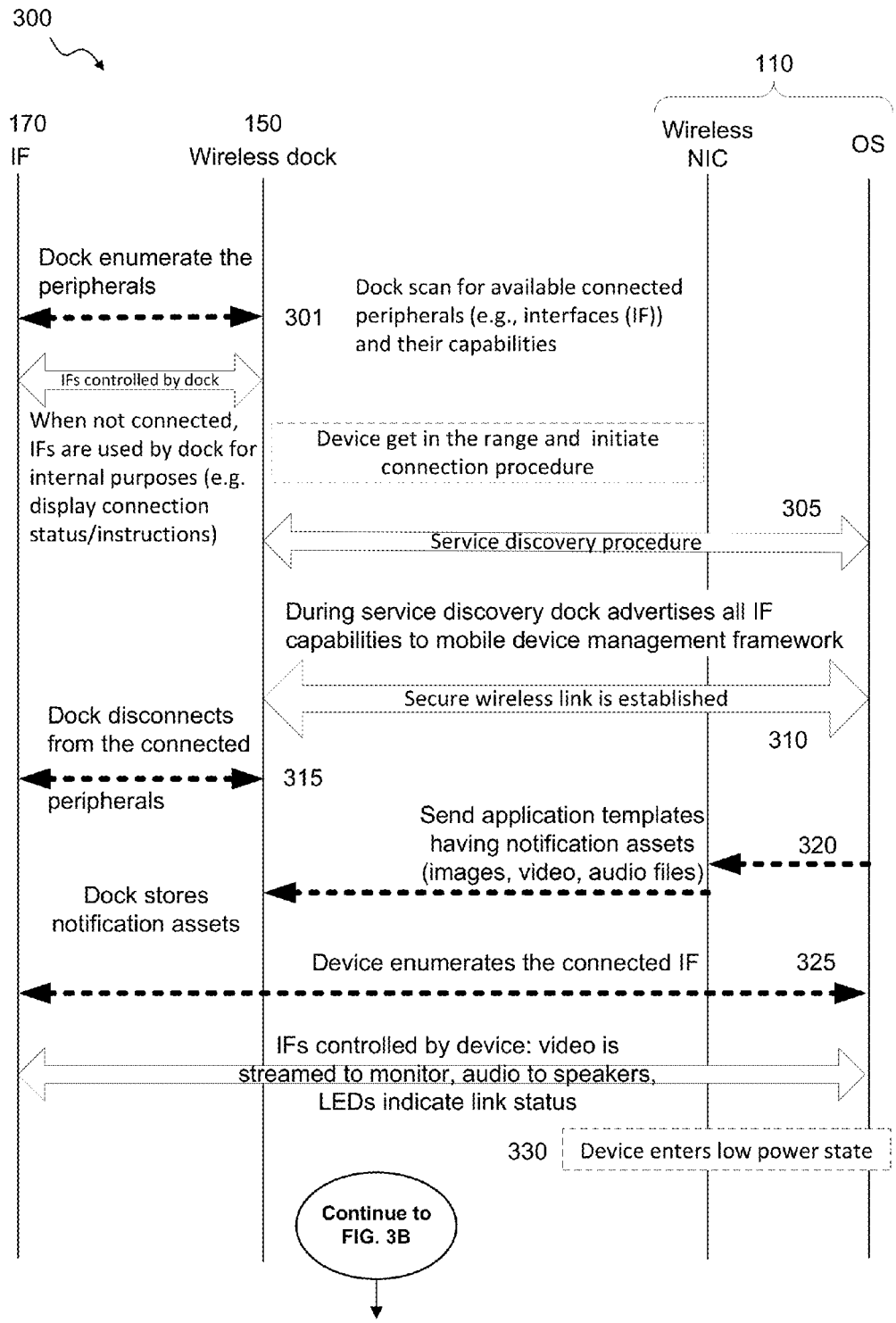
FIG. 3A-3B illustrate a notification method according to an exemplary aspect of the present disclosure.
Figure 3B:
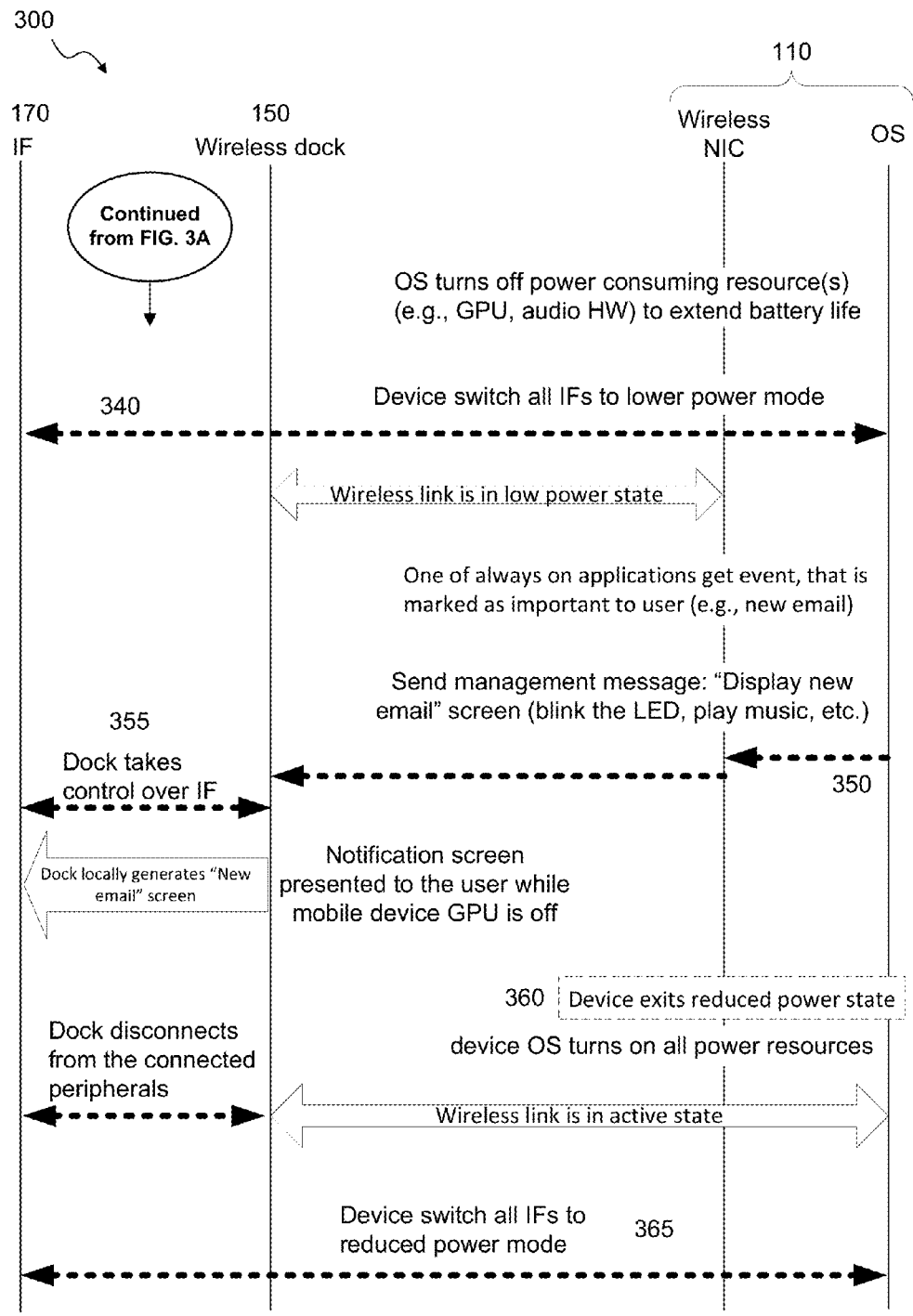

FIGS. 3A-3B illustrate a notification method according to an exemplary aspect of the present disclosure. The flowchart is described with continued reference to FIGS. 1-2. The steps of the method are not limited to the order described below, and the various steps may be performed in a different order. Further, two or more steps of the method may be performed simultaneously with each other.

With reference to FIG. 3A, the method of flowchart 300 begins at step 301, where the dock 150 enumerates one or more peripheral devices 170 that are connected to the dock 150. In an exemplary aspect, the dock 150 is configured to scan for available connected peripherals 170 (also referred to as interfaces (IF)) and determine their capabilities.

Upon scanning for available peripherals 170, the peripherals 170 are controlled by the dock 150. The dock 150 can be configured to use the peripherals 170 to, for example, provide status information for the dock 150, such as a connection status of a mobile device to the dock 150 and/or power status information of the dock 150, and/or connection instructions to assist a user to connect a mobile device to the dock 150.

After step 301, the method of flowchart 300 transitions to step 305, where a service discovery procedure is performed as a mobile device enters the wireless connection range of the dock 150 to establish a connection to the dock 150. In an exemplary embodiment, the mobile device 210 is configured to perform a connection procedure to connect to the dock 150. During the service discovery procedure, the dock 150 can advertise the capabilities of one or more peripheral devices 170 to the mobile device 210.

After step 305, the method of flowchart 300 transitions to step 310, where the mobile device (e.g. mobile device 210) connects to the dock 150 and a wireless link (e.g., communication link 130) is established.

After step 310, the method of flowchart 300 transitions to step 315, where the dock 150 gives up control of one or more peripherals 170. In an exemplary aspect, the dock 150 gives up control of the peripheral(s) 170 so that they may be controlled by the connected mobile device 210 (see Step 325).

After step 315, the method of flowchart 300 transitions to step 320, where one or more notification templates are generated and provided to the dock 150. In an exemplary aspect, the mobile device 210 generates one or more notification templates corresponding to a respective notification. The mobile device 210 can then provide the generated notification templates to the dock 150. Upon receipt, the dock 170 can store the notification template(s) in one or more internal or external memory devices. In an exemplary aspect, the notification templates can be maintained in the memory of the dock 150 after the mobile device 210 is disconnected from the dock 150 and be utilized upon a reconnection of the mobile device 210. In other aspects, the stored templates can be deleted upon a disconnection.

In an exemplary aspect, a notification template includes notification assets, such as image, video, and/or audio data corresponding to a notification. In an exemplary aspect, the notification template can also include control information that defines one or more parameters for a notification image/video/audio for a corresponding notification. The parameters can define one or more attributes of a corresponding notification. In an exemplary aspect, the notification controller 115 is configured to generate the notification templates.

After step 320, the method of flowchart 300 transitions to step 325, where the mobile device 210 enumerates one or more peripheral devices 170 that are connected to the dock 150. In as exemplary aspect, the mobile device 210 takes control of one or more peripheral devices 170 that the dock 170 has relinquished control of (in step 315). In this example, images, video, and/or audio from the mobile device 210 can be streamed to the dock 150 via the communication path 130 and output by a corresponding peripheral device 170 connected to the dock 150. For example, video and/or images can be streamed to a display connected to the dock 150, audio can be streamed and output by one or more speakers connected to the dock 150, and/or LEDs of the dock 150 can indicate one or more statuses associated with the mobile device 210.

After step 325, the method of flowchart 300 transitions to step 330, where the mobile device 210 can enter a reduced-power mode. In an exemplary aspect, the mobile device 210 can be configured to operate in a reduced power mode where the power consumption of the mobile device 210 is reduced. In a reduced power mode, the mobile device 210 can reduce the power consumption or turn off one or more components of the mobile device 210. For example, the mobile device 210 can periodically turn off one or more wireless radios, reduce processor frequencies, reduce display brightness, reduce graphical and/or audio processing, or one or more other operations to reduce power consumption as would be understood by one of ordinary skill in the relevant arts.

In an exemplary aspect, while in a reduced power mode, the mobile device 210 can selectively generate and/or output notifications based on one or more characteristics of the notification. For example, notifications can be hierarchically classified, and the mobile device 210 can omit the generation and/or output of low-level notifications and allow only high-level (e.g., important) notifications to be generated and/or output. For example, the mobile device 210 can select to omit notifications from one or more user applications, but allow notifications from email, SMS, phone, or other events deemed as a high-level notification. The selection of notifications during a reduced power mode can be based on the notification templates generated by the mobile device 210 and provided to the dock 150. For example, the mobile device 210 can designate one or more notification templates to be used when the mobile device 210 is operating in reduced power mode. The designation can be made by, for example, the control information of the corresponding notification template.

Turning to FIG. 3B, after step 330, the method of flowchart 300 transitions to step 340, where the mobile device 210 instructs one or more of the peripheral devices 170 to operate in a reduced power mode configuration. In an exemplary aspect, the mobile device 210 allows the peripheral device(s) 170 to be utilized by the dock 150 (e.g., by multimedia system 160) to allow audio/image/video data that has been generated by the dock 150 to be outputted by the peripheral devices 170 connected to the dock 150. In this example, the mobile device 210 retains control of the peripheral devices 170 via control path 220 with the dock 150 while allowing the components of the dock 150 (e.g., multimedia system 160) to establish a data connection via the data path 225 to the peripheral devices 170.

After step 340, the method of flowchart 300 transitions to step 350, where the mobile device 210 generates one or more notification control signals and provides the notification control signal(s) to the dock 150. In an exemplary aspect, the notification controller 115 of the mobile device 210 can generate the notification control signal(s) and provide the notification control signal(s) to the multimedia system 160 of the dock 150 via the control path 220. As described below in step 355, the dock 150 is controlled to present a notification based on the corresponding notification template specified by the notification control signal.

After step 350, the method of flowchart 300 transitions to step 355, where the dock 150 presents a notification based on the corresponding notification template specified by the notification control signal. In an exemplary aspect, the notification control signal received by the dock 150 identifies a corresponding notification template and controls the dock 150 to generate a notification using the notification assets (e.g., audio, image, video files) included in the notification template. In this example, the dock 150 takes control of the peripheral device(s) 170 specified in the notification template and controls the peripheral device(s) 170 to output the notification generated by the dock 150 based on the notification template. In an exemplary aspect, the multimedia system 160 of the dock 150 generates the notification based on the notification template and provides the notification to the peripheral device 170 via data path 225.

For example, if the mobile device 210 receives an email, the mobile device 210 can generate a notification control signal corresponding to the received email, and provide the notification control signal to the multimedia system 160 of the dock 150 via the control path 220. The notification control signal controls the multimedia system 160 to generate a notification based on the corresponding notification template identified by the notification control signal. In this example, the notification control signal can identify that an email was received, and the dock 150 can use the notification template associated with an email event to generation the notification. If there are multiple notification templates for email events (e.g., based on a particular sender, etc.), the notification control signal can identify one of a plurality of email notification templates that were previously provided to the dock 150. The generated notification (e.g. display "new email" on the display peripheral device 170 and play the audio file on the speakers of the dock 170) can generated by the multimedia system 160 and then be presented by the dock 150 via the corresponding peripheral devices 170. In this example, the mobile device 170 uses limited power resources when generating the notification control signal while the dock 150 performs the more power intensive processing necessary to generate and present the notification.

After step 355, the method of flowchart 300 transitions to step 360, where the mobile device 210 exits the reduced power mode and returns to a non-reduced (normal) operating mode.

After step 360, the method of flowchart 300 transitions to step 365, where the mobile device 210 instructs one or more of the peripheral devices 150 to operate in a non-reduced power mode configuration.

In an exemplary aspect, the mobile device 210 controls the dock 150 to return the peripheral device(s) 170 accessible to the multimedia system 160 of the dock 150 to the multimedia system 120 of the mobile device 210. In this example, the data path 220 is disconnected and the data path 140 is utilized between the mobile device 210 and the dock 150 as illustrated with FIG. 1. That is, notifications generated by the mobile device 210 can be generated and streamed to the dock 150 similar to the operations described with respect to FIG. 1.

After step 365, the flowchart 300 can be repeated. For example, if the notification templates are updated, the flowchart can return to step 320 to provide the updated notification templates to the dock 150.

EXAMPLES

Example 1 is a notification method for a communication device and docking system, comprising: generating, by the communication device, a notification template corresponding to a notification; providing, by the communication device, the notification template to the docking system; generating, by the communication device, a notification control signal that corresponds to the notification template; and controlling the docking system to present the notification in response to the notification control signal using one or resources of the docking system based on the notification template.

In Example 2, the subject matter of Example 1, wherein the notification template comprises at least one of: image data, video data, and audio data, wherein the notification is generated based on the at least one of the image, video, and audio data.

In Example 3, the subject matter of Example 1, further comprising: controlling the docking system to generate the notification based on the notification template.

In Example 4, the subject matter of Example 1, wherein the one or more resources of the docking system includes a multimedia system configured to generate at least one of image data, video data, and audio data to be presented as the notification.

In Example 5, the subject matter of Example 1, wherein the one or more resources of the docking system includes one or more peripheral devices connected to the docking system.

In Example 6, the subject matter of Example 1, wherein docking system is connected to one or more peripheral devices and the docking system presents the notification via at least one of the one or more peripheral devices.

In Example 7, the subject matter of Example 6, further comprising determining one or more capabilities of the one or more peripheral devices, wherein the generating the notification template is based on the determined one or more capabilities.

In Example 8, the subject matter of Example 1, further comprising: establishing, by the communication device, a connection with the docking system; and determining one or more peripheral devices connected to the docking system.

Example 9 is a communication device operable to communicate with a docking system, comprising: a network interface configured to establish a connection with the docking system; and a notification controller configured to: generate a notification template corresponding to a notification; provide the notification template to the docking system via the network interface; generate a notification control signal that corresponding to the notification template; and control the docking system to present the notification in response to the notification control signal using one or resources of the docking system based on the notification template.

In Example 10, the subject matter of Example 9, wherein, the notification template comprises at least one of: image data, video data, and audio data, wherein the notification is generated based on the at least one of the image, video, and audio data.

In Example 11, the subject matter of Example 9, wherein the notification controller is configured to: control the docking system to generate the notification based on the notification template.

In Example 12, the subject matter of Example 9, wherein the one or more resources of the docking system includes a multimedia system configured to generate at least one of image data, video data, and audio data to be presented as the notification.

In Example 13, the subject matter of Example 9, wherein the one or more resources of the docking system includes one or more peripheral devices connected to the docking system.

In Example 14, the subject matter of Example 9, wherein docking system is connected to one or more peripheral devices and the docking system presents the notification via at least one of the one or more peripheral devices.

In Example 15, the subject matter of Example 14, wherein the notification controller is configured to: determine one or more capabilities of the one or more peripheral devices, wherein the generation of the notification template is based on the determined one or more capabilities.

Example 16 is a notification method for a communication device and docking system connected to at least one peripheral device, the method comprising: generating, by the communication device, a notification template corresponding to a notification; providing, by the communication device, the notification template to the docking system; generating, by the communication device, a notification control signal that identifies the notification template; controlling the docking system to generate the notification based on the notification template; and controlling the docking system to present the generated notification in response to the notification control signal using the at least one peripheral device based on the notification template.

In Example 17 the subject matter of Example 16, wherein the notification template comprises at least one of: image data, video data, and audio data, wherein the notification is generated based on the at least one of the image, video, and audio data.

In Example 18 the subject matter of Example 16, wherein the docking system includes a multimedia system configured to generate at least one of image data, video data, and audio data to be presented as the notification.

In Example 19 the subject matter of Example 16, further comprising determining one or more capabilities of the at least one peripheral devices, wherein the generating the notification template is based on the determined one or more capabilities.

In Example 20 the subject matter of Example 16, wherein the communication device is configured to operate in a reduced power mode, and the generation of the notification control signal, controlling the generation of the notification, and controlling the presentation of the notification are performed while operating in the reduced power mode.

Example 21 is a communication device operable to communicate with a docking system, comprising: a network interface means for establishing a connection with the docking system; and a notification controlling means for: generating a notification template corresponding to a notification; providing the notification template to the docking system via the network interface means; generating a notification control signal that corresponding to the notification template; and controlling the docking system to present the notification in response to the notification control signal using one or resources of the docking system based on the notification template.

In Example 22 the subject matter of Example 21, wherein, the notification template comprises at least one of: image data, video data, and audio data, wherein the notification is generated based on the at least one of the image, video, and audio data.

In Example 23 the subject matter of any of Examples 21-22, wherein the notification controlling means controls the docking system to generate the notification based on the notification template.

In Example 24 the subject matter of any of Examples 21-23, wherein the one or more resources of the docking system includes a multimedia system means for generating at least one of image data, video data, and audio data to be presented as the notification.

In Example 25 the subject matter of any of Examples 21-24, wherein the one or more resources of the docking system includes one or more peripheral devices connected to the docking system.

In Example 26 the subject matter of any of Examples 21-23, wherein docking system is connected to one or more peripheral devices and the docking system presents the notification via at least one of the one or more peripheral devices.

In Example 27 the subject matter of Example 26, wherein the notification controlling means determines one or more capabilities of the one or more peripheral devices, wherein the generation of the notification template is based on the determined one or more capabilities.

Example 28 is an apparatus comprising means to perform the method as claimed in any of claims 1-8 and 16-20.

Example 29 is a computer program product embodied on a computer-readable medium comprising program instructions, when executed, causes a processor to perform the method of any of claims 1-8 and 16-20.

Example 30 is an apparatus substantially as shown and described.

Example 31 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE), and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A notification method for a communication device and docking system connected to one or more peripheral devices, comprising:
   determining one or more capabilities of the one or more peripheral devices connected to docking system;
   generating, by the communication device, a notification template corresponding to a notification based on the determined one or more capabilities, the notification template comprising a notification asset and notification control information, wherein the notification control information determines one or more parameters of the notification asset for the notification;
   providing, by the communication device, the notification template to the docking system;
   generating, by the communication device, a notification control signal that corresponds to the notification template; and
   controlling, in response to the notification control signal, the docking system to present the notification asset of the notification template as the notification via at least one of the one or more peripheral devices using one or more resources of the docking system based on the notification control information of the notification template.

2. The notification method of claim 1, wherein the notification asset of the notification template comprises at least one of: image data, video data, and audio data, wherein the notification is generated based on the at least one of the image, video, and audio data.

3. The notification method of claim 1, wherein the one or more resources of the docking system includes a multimedia system configured to generate, based on the notification asset, at least one of image data, video data, and audio data to be presented as the notification.

4. The notification method of claim 1, further comprising:
establishing, by the communication device, a connection with the docking system; and
determining the one or more peripheral devices connected to the docking system.

5. The notification method of claim 1, wherein the one or more parameters of the notification asset define one or more corresponding attributes of the notification.

6. The notification method of claim 1, wherein both the notification asset and the notification control information are associated with the notification.

7. A communication device operable to communicate with a docking system connected to one or more peripheral devices, comprising:
a network interface configured to establish a connection with the docking system; and
a notification controller configured to:
determine one or more capabilities of the one or more peripheral devices connected to docking system;
generate a notification template corresponding to a notification based on the determined one or more capabilities, the notification template comprising a notification asset and notification control information, wherein the notification control information determines one or more parameters of the notification asset for the notification;
provide the notification template to the docking system via the network interface;
generate a notification control signal that corresponds to the notification template; and
control the docking system, in response to the notification control signal, to present the notification asset of the notification template as the notification via at least one of the one or more peripheral devices using one or more resources of the docking system based on the notification control information of the notification template.

8. The communication device of claim 7, wherein the notification asset of the notification template comprises at least one of: image data, video data, and audio data, wherein the notification is generated based on the at least one of the image, video, and audio data.

9. The communication device of claim 7, wherein the one or more resources of the docking system includes a multimedia system configured to generate, based on the notification asset, at least one of image data, video data, and audio data to be presented as the notification.

10. A notification method for a communication device and docking system connected to at least one peripheral device, the method comprising:
determining one or more capabilities of the at least one peripheral device connected to docking system;
generating, by the communication device, a notification template corresponding to a notification based on the determined one or more capabilities, the notification template comprising a notification asset and notification control information, wherein the notification control information determines one or more parameters of the notification asset for the notification;
providing, by the communication device, the notification template to the docking system;
generating, by the communication device, a notification control signal that identifies the notification template;
controlling the docking system to generate the notification based on the notification asset of the notification template; and
controlling the docking system, in response to the notification control signal, to present the generated notification using the at least one peripheral device based on the notification control information of the notification template.

11. The notification method of claim 10, wherein the notification asset of the notification template comprises at least one of: image data, video data, and audio data, wherein the notification is generated based on the at least one of the image, video, and audio data.

12. The notification method of claim 10, wherein the docking system includes a multimedia system configured to generate, based on the notification asset, at least one of image data, video data, and audio data to be presented as the notification.

13. The notification method of claim 10, wherein the communication device is configured to operate in a reduced power mode, and the generation of the notification control signal, controlling the generation of the notification, and controlling the presentation of the notification are performed while operating in the reduced power mode.

* * * * *